Figure 1:
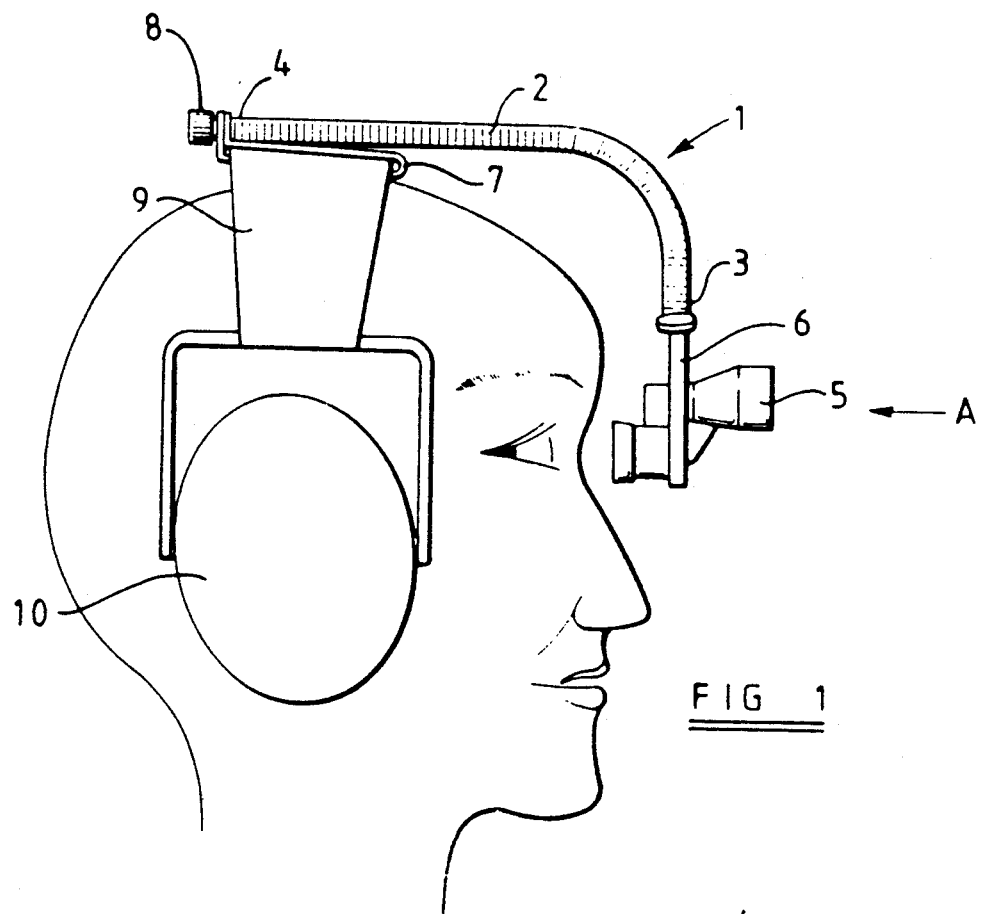

United States Patent [19]

Green

[11] Patent Number: 5,173,721
[45] Date of Patent: Dec. 22, 1992

[54] OPTICAL AID ATTACHMENT FOR EAR PROTECTORS

[76] Inventor: Graham Green, Forsyte Research, Unicorn House, Coniston Way, Cannock, Staffordshire, England, WS11 1DT

[21] Appl. No.: 577,878
[22] Filed: Sep. 5, 1990
[51] Int. Cl.⁵ .............................. G02C 7/00
[52] U.S. Cl. .................... 351/53; 351/158; 2/423
[58] Field of Search ............ 351/53, 59, 158, 57; 2/422, 423, DIG. 11

[56] References Cited

U.S. PATENT DOCUMENTS 3,510,204 5/1970 Jack .
4,190,322 2/1980 Wortley .

FOREIGN PATENT DOCUMENTS 9643 of 1904 United Kingdom ............ 351/53
206311 11/1923 United Kingdom .
552729 4/1943 United Kingdom .

Primary Examiner—Paul M. Dzierzynski
Attorney, Agent, or Firm—Wolf, Greenfield & Sacks

[57] ABSTRACT

An optical aid for use by competitors in target shooting comprises a flexible metallic tube attached at one end to a pair of ear defenders worn by the competitor and having at the other end a monocular device that can be positioned in front of the competitor's non-sighting eye for viewing the target between shots.

3 Claims, 1 Drawing Sheet

OPTICAL AID ATTACHMENT FOR EAR PROTECTORS

The present invention is concerned with an optical aid for use by those practising target shooting with pistols, small or full bore rifles.

In competition target shooting it is normal for the competitor to use a spotting scope in order to monitor his last shot, i.e.; to determine precisely where the last shot penetrated the target, in order that he can make an appropriate change, if necessary, to his aim for the next shot. However because the scope has to be placed to one side of the competitor, whether firing from a standing or prone position, it is necessary for him to move at least his head, and frequently to disturb the position of his gun, in order to use the scope, thus making a precise change of aim more difficult to achieve. It is desirable, therefore, to have a means for spotting the last shot without the need for the competitor to move either his head or his gun.

I have now developed an optical aid that significantly ameliorates the aforesaid problem.

My invention comprises a lens, e.g.; a monocular, adjustably secured, preferably releasably, to one end of a flexibly adjustable rod or tube of suitable material, at the other end of which rod or tube is secured means to attach, preferably releasably, the rod or tube to a suitable position on the user's head or body, such that the lens may be located at the required distance in front of one of the user's eyes.

Conveniently the rod or tube may be releasably secured to the head band of a conventional set of ear defenders. The rod or tube is preferably of a multi-jointed metallic construction, although any suitable flexible material may be employed provided that the position of the lens that has been selected is retained during shooting.

Figure 2:
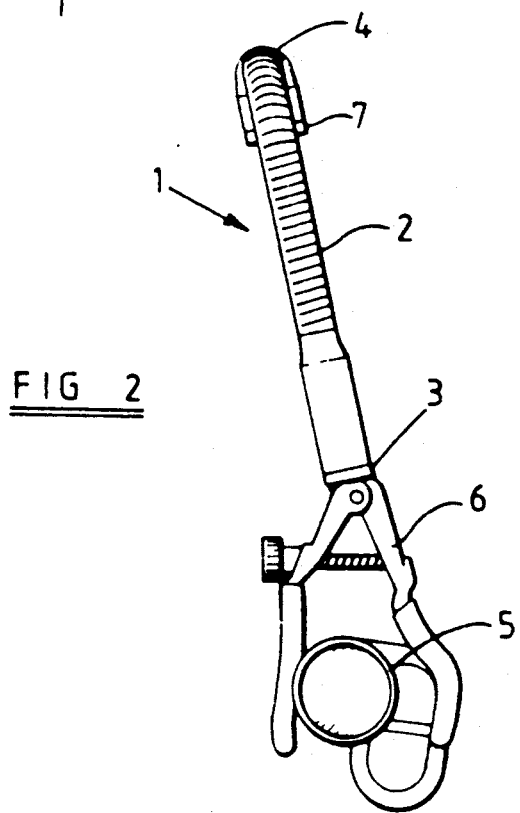

One embodiment of the invention will now be described with reference to the accompanying drawings in which;

FIG. 1 is a side view of a device of the present invention attached to the user's head, FIG. 2 is a view of the device alone in the direction A in FIG. 1.

The device of the present invention, generally indicated at 1, comprises a multi-jointed flexible metallic tube 2 having ends 3 and 4. A monocular, 5, is releasably attached to the end 3 of tube 2 by means of the clamp 6 fixedly located at end 3 of the tube 2. At the other end, 4, of tube 2 there is positioned a loop member 7 the ends of which are secured to end 4 by means of the knurled nut 8 which screw threadedly engages end 4.

Looped member 7 is conveniently attached around the head band 9 of conventional ear defender including ear muffs 10, when placed on the user's head as illustrated in FIG. 1.

It is to be understood that any suitable means for attaching the monocular 5 to end 3 of tube 2 may be employed and that, further, other means of attachment of the device to the user's head or body may be employed where appropriate.

Use of the device of the present invention enables the competitor to clearly see the bullet holes in his target after each shot. Since the magnifying lens of the monocular remains in front of an eye of the user it is constantly aligned with the target and thus, merely by closing the other eye, the user is able to inspect the target without need to move his head or his position and aim. An additional benefit is that for those competitors who need to keep both eyes open while firing the monocular device will help blur the vision of the eye that is not being used for sighting, thus leaving the sighting eye dominant.

I claim:

1. A combined optical and ear defender device for use by competitors in target shooting comprising:
    a pair of ear muff defenders secured to each end of a band passing over the head of the competitor,
    an elongate adjustable flexible element secured at one end to said headband,
    a member including a lens secured to the other end of said adjustable flexible element,
    whereby the lens can be located at any required distance in front of the eye of the competitor.

2. A combined optical and ear defender device according to claim 1 wherein the member including a lens is a monocular device.

3. A device according to claim 1 wherein the adjustable flexible element comprises a multi-jointed rod or tube of metallic construction.

* * * * *